(12) United States Patent
Shapiro et al.

(10) Patent No.: US 12,403,549 B2
(45) Date of Patent: Sep. 2, 2025

(54) MECHANICAL SYSTEM FOR HIGH POSITIONAL COMPUTER NUMERICALLY CONTROLLED APPLICATIONS

(71) Applicant: Glowforge, Inc., Seattle, WA (US)

(72) Inventors: Daniel Shapiro, Seattle, WA (US);
Mark Gosselin, Seattle, WA (US);
Douglas Webster, Seattle, WA (US)

(73) Assignee: Glowforge, Inc., Seattle, WA (US)

( * ) Notice: Subject to any disclaimer, the term of this patent is extended or adjusted under 35 U.S.C. 154(b) by 863 days.

(21) Appl. No.: 17/511,000

(22) Filed: Oct. 26, 2021

(65) Prior Publication Data

US 2023/0128807 A1 Apr. 27, 2023

(51) Int. Cl.
*B23K 26/08* (2014.01)

(52) U.S. Cl.
CPC ............... *B23K 26/0876* (2013.01); *G05B 2219/33198* (2013.01); *G05B 2219/40293* (2013.01)

(58) Field of Classification Search
CPC ........... B23K 26/0876; B23K 26/0869; B23K 26/10; G05B 2219/33198; G05B 2219/40293
See application file for complete search history.

(56) References Cited

U.S. PATENT DOCUMENTS

| | | | | |
|---|---|---|---|---|
| 3,736,402 A | * | 5/1973 | Mefferd | B23K 26/042 901/41 |
| 4,985,780 A | * | 1/1991 | Garnier | B23K 26/10 219/121.68 |
| 5,051,558 A | * | 9/1991 | Sukhman | B23K 26/128 219/121.75 |
| 9,266,193 B2 | * | 2/2016 | Liu | B23K 26/0665 |
| 2003/0034336 A1 | * | 2/2003 | Erlenmaier | B23K 26/0876 219/121.67 |
| 2007/0034613 A1 | * | 2/2007 | Lundberg | B23K 26/0876 219/121.68 |
| 2019/0111525 A1 | * | 4/2019 | Okamura | H02K 41/031 |
| 2021/0121985 A1 | * | 4/2021 | Rubens | B23K 37/0538 |
| 2021/0237205 A1 | * | 8/2021 | Liu | B23K 26/38 |

FOREIGN PATENT DOCUMENTS

| | | |
|---|---|---|
| CN | 208276343 U | 12/2018 |
| CN | 109146781 A | 1/2019 |
| CN | 210651907 U | 6/2020 |
| CN | 109048072 B | 7/2020 |
| CN | 111515523 A | 8/2020 |
| CN | 113971661 A | 1/2022 |
| CN | 215846437 U | 2/2022 |
| CN | 108846819 A | 5/2022 |

* cited by examiner

*Primary Examiner* — Zakaria Elahmadi

(74) *Attorney, Agent, or Firm* — Akerman LLP

(57) ABSTRACT

Disclosed embodiments include a gantry assembly that has (i) a moveable carriage with a laser head affixed thereto and (ii) two sides (moveable subassemblies) that are connected by a joining subassembly. One side of the gantry has two motors: (i) a first motor (x-axis motor) that moves the carriage along a first axis (x-axis) between the two sides of the gantry, and (ii) a second motor (y-axis motor) that moves the gantry along a second axis (y-axis) perpendicular to the first axis. In some embodiments, the gantry assembly also includes a drive shaft (or alternative drive mechanism) operated by the second motor (y-axis motor) to facilitate movement of the two sides of the gantry together along the second axis (y-axis).

20 Claims, 9 Drawing Sheets

MECHANICAL SYSTEM FOR HIGH POSITIONAL COMPUTER NUMERICALLY CONTROLLED APPLICATIONS

FIELD OF THE DISCLOSURE

The subject matter described herein relates to controlling the position of a laser in a computer numerically controlled (CNC) machine configured for laser cutting, laser drilling, laser ablation, laser engraving, and laser machining applications. Aspects of the disclosed subject matter may additionally relate to other types of CNC machines as well.

BACKGROUND

A computer numerically controlled (CNC) machine operates by moving a tool over a material to be machined. In some CNC machines, moving the tool over the material to be machined comprises moving a laser or similar energy source configured to deliver electromagnetic energy to one or more locations along the material to be machined.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1:
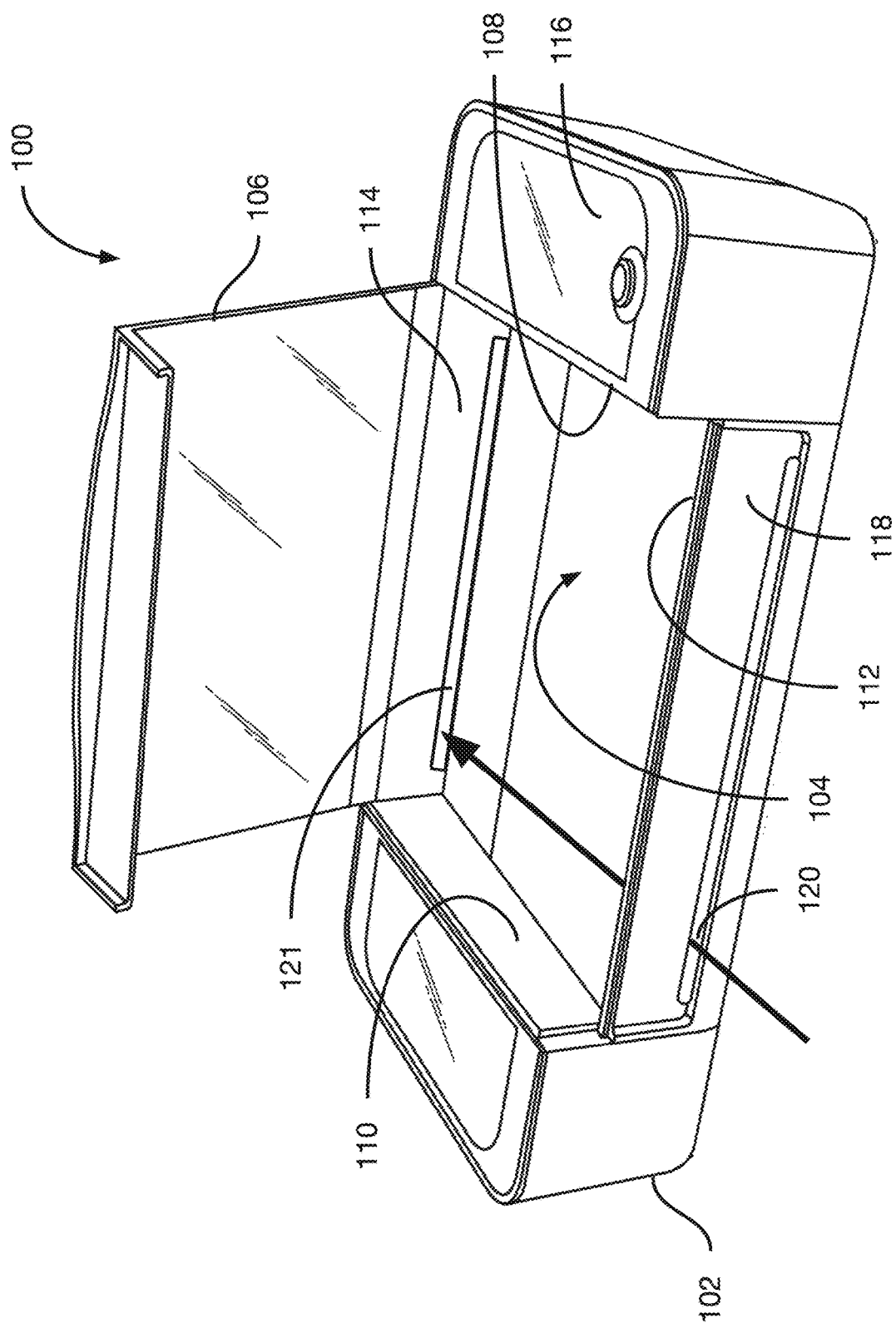
FIG. 1 shows aspects of a computer numerically controlled (CNC) machine according to some embodiments.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Some types of computer numerically controlled (CNC) machines such as CNC machines for laser cutting, laser drilling, laser ablation, laser engraving, laser machining, laser-based three-dimensional (3D) printers, and other types of CNC machines operate by moving a laser (or similar electromagnetic emission source) over a material to be machined, thereby burning, cutting, ablating, vaporizing, melting, or otherwise removing portions of the material to be machined. In connection with moving the laser over the material to be machined, it is desirable to have precise control over the movement, alignment, and positioning of the laser over the material to be machined because a more precisely controlled laser enables the CNC machine to produce a more precisely machined material and thus, a higher quality end product as compared to CNC machines with less precisely controlled lasers.

Typical CNC machines control the movement, alignment, and positioning of the laser over the material to be machined via an arrangement of components that can add cost and complexity to the CNC machine. For example, typical CNC machines include multiple stepper motors and electronic systems configured to drive a gantry assembly arranged to control the movement, alignment, and positioning of the laser over the material to be machined with the CNC machine. These sets of motors, controllers, and gantry structures often also require fixtures that can limit the functionality of the CNC machine in some respects. For example, typical gantry assemblies require stabilizing beams, shafts, and/or other support structures that can limit the range of movement of the gantry assembly, and thus, the laser head. These stabilizing beams, shafts, and/or other support structures can also obstruct material pass-through areas or other regions within the operating area of the CNC machine, thereby limiting the size of the materials that the CNC machine can process (i.e., limiting the CNC machine's ability to accept larger pieces of material for processing within the CNC machine).

Embodiments disclosed and described herein overcome or at least ameliorate some of the above-described shortcomings of typical CNC machines by implementing a new gantry assembly that provides precise control over the movement, alignment, and positioning of the laser over the material to be machined, but with fewer components and stabilizing beams, shafts, and/or other support structures as compared to CNC machines with traditional gantry assemblies.

For example, some embodiments include a gantry that has (i) a moveable carriage with a laser head affixed thereto and (ii) two sides (moveable subassemblies) that are connected by a joining subassembly. One side of the gantry has two motors: (i) a first motor (x-axis motor) that moves the carriage back and forth across the joining subassembly along a first axis (x-axis) between the two sides of the gantry, and (ii) a second motor (y-axis motor) that moves the gantry along a second axis (y-axis) substantially perpendicular to the first axis. In some embodiments, the gantry also includes a drive shaft (or alternative drive mechanism) operated by the second motor (y-axis motor) to facilitate movement of the two sides of the gantry together along the second axis (y-axis). In embodiments where the two motors are mounted on the same side of the gantry, the position of the first motor relative to the second motor remains constant in operation while both (i) the carriage moves back and forth across the joining subassembly along the x-axis and (ii) the two sides of gantry move together along the y-axis, thereby moving the carriage along the y-axis.

While some examples described herein may refer to functions performed by given actors such as "users" and/or other entities, it should be understood that this is for purposes of explanation only. The claims should not be interpreted to require action by any such example actor unless explicitly required by the language of the claims themselves.

In the Figures, identical reference numbers typically identify generally similar, and/or identical, elements. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example CNC Machine Embodiments

FIG. 1 shows aspects of a computer numerically controlled (CNC) machine 100 according to some embodiments. The CNC machine 100 includes a housing 102, an interior space 104, and a lid 106. The interior space 104 of the housing 102 is defined by four interior walls 108, 110, 112, and 114. Interior wall 110 is along the left side of the interior space 104, interior wall 108 is along the right side of the interior space 104, interior wall 114 is along the back side of the interior space 104 below where the lid 106 joins with the housing 102, and interior wall 112 is along the front side of the interior space 104 on the inside of a front cover plate 118 where the lid 106 closes to enclose the interior space 104. CNC machine 100 also includes pass-through slots 120 and 121 that enables materials that are to be machined to be slid through the front cover plate 118 and back wall 114. In some embodiments, the front cover plate 118 may be removable to create a larger area, which facilitates machining of materials that may be too large to fit through the pass-through slot 120. In alternate embodiments, pass-through slots may be positioned on the side walls 110 and 112 instead of or in addition to the pass-through slots 120 and 121 that are positioned on the front and rear walls 108 and 114, respectively. However, the interior space in other embodiments may be defined by more or fewer interior walls configured differently than shown in the example illustrated in FIG. 1.

The interior space 104 is arranged to accommodate a gantry assembly (e.g., gantry assembly 300 shown in FIG. 3A) within the interior space 104. The gantry assembly is arranged to control the movement, alignment, and positioning of a laser head arranged to apply laser energy to materials placed within the interior space 104 of the housing 102 of the CNC machine 100. In operation, material to be machined (not shown) is placed into the interior space 104 of the housing 102, the lid 106 is closed, and the CNC machine 100 controls (via the gantry assembly, e.g., gantry assembly 300) the movement, alignment, and positioning of the laser head over the material to be machined within the interior space 104 of the housing 102.

CNC machine 100 also includes a control compartment 116 that is configured to house electrical components for powering and/or controlling the CNC machine 100. By housing the electrical components within the control compartment 116, the electrical components are protected from the conditions (e.g., heat, smoke, laser energy reflections) inside the interior space 104 where the laser operates.

For example, in some embodiments, control compartment 116 is configured to house one or more processors and tangible, non-transitory computer readable media (e.g., computer memory). In some configurations, the one or more processors and/or the tangible, non-transitory computer readable media are mounted on one or more circuit boards within the control compartment 116. In some embodiments, one or more processors are configured to communicate with sensors located in the interior space 104, on the gantry assembly, and/or elsewhere on or within the housing 102 to collect information on the operation of the CNC machine 100 that can be used for controlling various aspects of the CNC machine 100, such as operating fans or operating safety features of the CNC machine 100 (e.g., safety shutdown).

In some embodiments, the control compartment 116 additionally includes one or more communications interfaces configured to communicate with one or more external computing systems (e.g., a personal computer, laptop, smartphone, tablet computer, and/or Internet-based server system). The one or more communications interfaces may be any type of wireless and/or wired communications interface, e.g., WiFi, Bluetooth, Ethernet, or any other type of communications interface now known or later developed that is suitable for transmitting and receiving data between the CNC machine 100 and the one or more external computing systems. In operation, the one or more computing systems include their own one or more processors and tangible, non-transitory computer readable media with instructions for communicating with the CNC machine 100 and controlling the operation of the CNC machine 100.

In operation, the one or more processors of the CNC machine 100 execute program instructions stored on the tangible, non-transitory computer readable media of the CNC machine 100. In some embodiments, the program instructions include instructions for controlling movement of the gantry (and thus, the laser head) within the interior space 104 of the housing 102 via motors, gears, and pulleys of the gantry assembly as described in further detail herein. In some embodiments, the control compartment 116 may additionally house power supplies and related electronics for powering and/or controlling the electric motors that control the movement and positioning of the gantry (and thus, the carriage 302 and ultimately the laser head).

III. Typical Gantry Assemblies

Figure 2A:
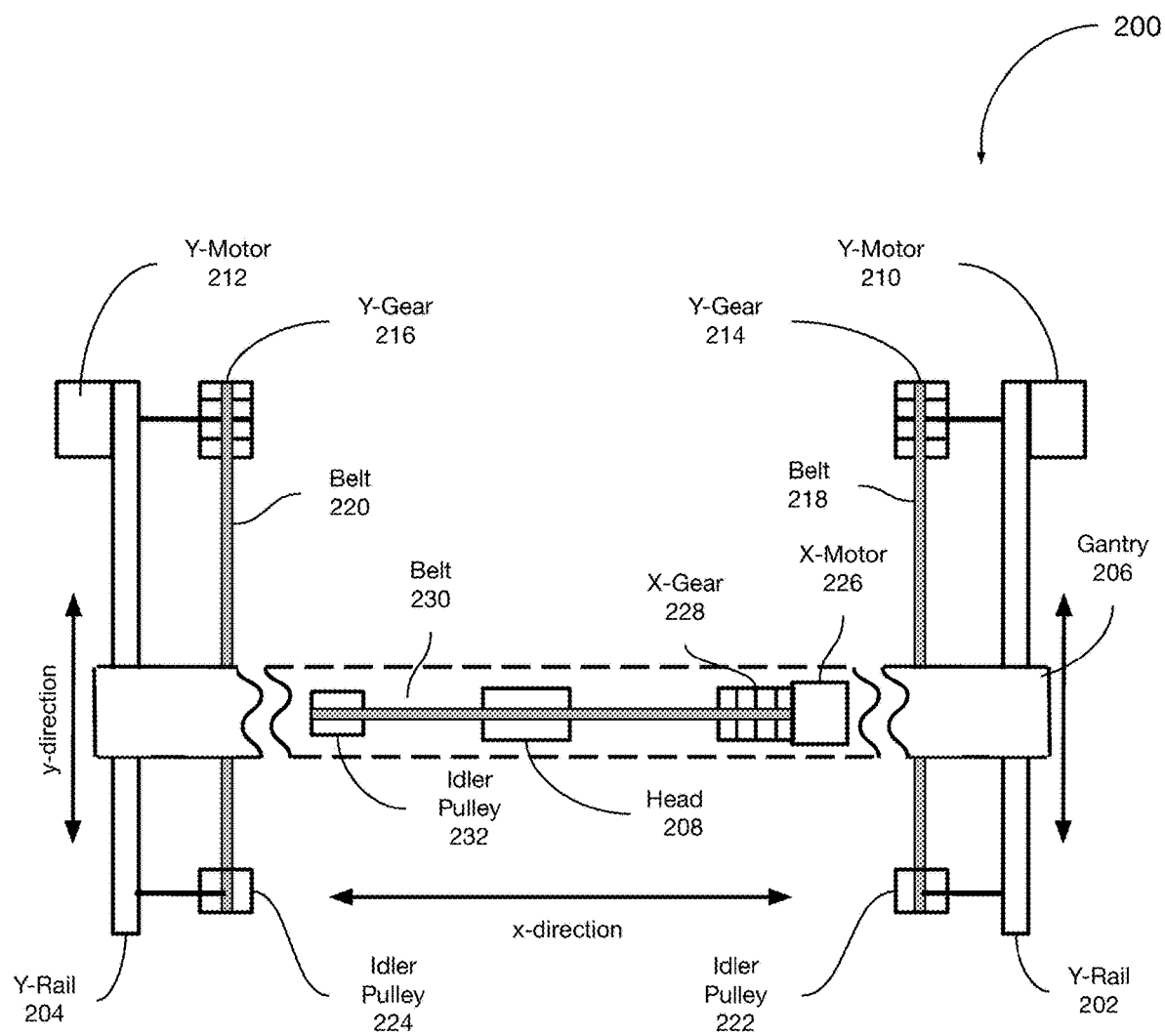
FIG. 2A shows a top view of a gantry assembly.

FIG. 2A shows a top view of a gantry assembly 200. In operation, gantry assembly 200 may be installed within a CNC machine. For example, gantry assembly 200 may be installed within the interior space 104 of the housing 102 of the CNC machine 100.

Gantry assembly 200 is a linear system that includes two y-rails 202 and 204 to support the motion of a gantry 206 in the y-direction. The gantry 206 (e.g., formed from extruded metal) spans the distance between the two y-rails 202 and 204 to support the motion of the laser head 208 (affixed to the gantry 206) in the x-direction.

Gantry assembly 200 also includes two separate y-motor/belt/idler pulley subassemblies, where each y-motor/belt/idler pulley subassembly is attached to one of the y-rails 202 and 204 and arranged to control the motion of the gantry 206 in the y-direction. In particular, y-motor 210 (e.g., a stepper motor) is coupled to y-gear 214, which drives belt 218, which runs between the y-gear 214 and idler pulley 222. The y-motor/belt/idler pulley subassembly formed from y-motor 210, y-gear 214, belt 218, and idler pulley 222 is attached to y-rail 202. Similarly, y-motor 212 (e.g., a stepper motor) is coupled to y-gear 216, which drives belt 220, which runs between the y-gear 216 and idler pulley 224. The y-motor/belt/idler pulley subassembly formed from y-motor 212, y-gear 216, belt 220, and idler pulley 224 is attached to y-rail 204. In operation, the y-motor 212 and the y-motor 210 must operate in a closely coordinated manner to accurately control the movement and positioning of the gantry 206. The arrangement of gearing and mechanical components to closely coordinate the operation of y-motor 212 and y-motor 210 adds cost and complexity to the CNC machine.

Gantry assembly 200 also includes x-motor 226 (e.g., a stepper motor), coupled to an x-gear 228, which drives belt 230, which runs between x-gear 228 and idler pulley 232. In operation, the x-motor 226, x-gear 228, belt 230, and idler pulley 232 work in concert to control the motion of the laser head 208 in the x-direction by moving the laser head 208 (which includes the laser (not shown)) back and forth along the gantry 206 between y-rail 202 and y-rail 204.

Each of the y-motor 210, y-motor 212, and x-motor 226 requires its own power and control signals and corresponding wiring routed thereto (not shown).

One typical design goal of a laser system is a lightweight gantry. A lightweight gantry can be moved at satisfactory speeds for laser applications with lower powered electric motors as compared to a heavier gantry, which would require higher powered (and therefore more expensive) motors to move the heavier gantry at the same speed as the lightweight gantry. Because electric motors tend to be one of the heavier individual components of a gantry drive system, the gantry assembly 200 attempts to satisfy the design goal of a lightweight gantry by locating only the x-motor 226 on the gantry 206 and locating the y-motors 210 and 212 off of the gantry on y-rails 202 and 204.

Figure 2B:
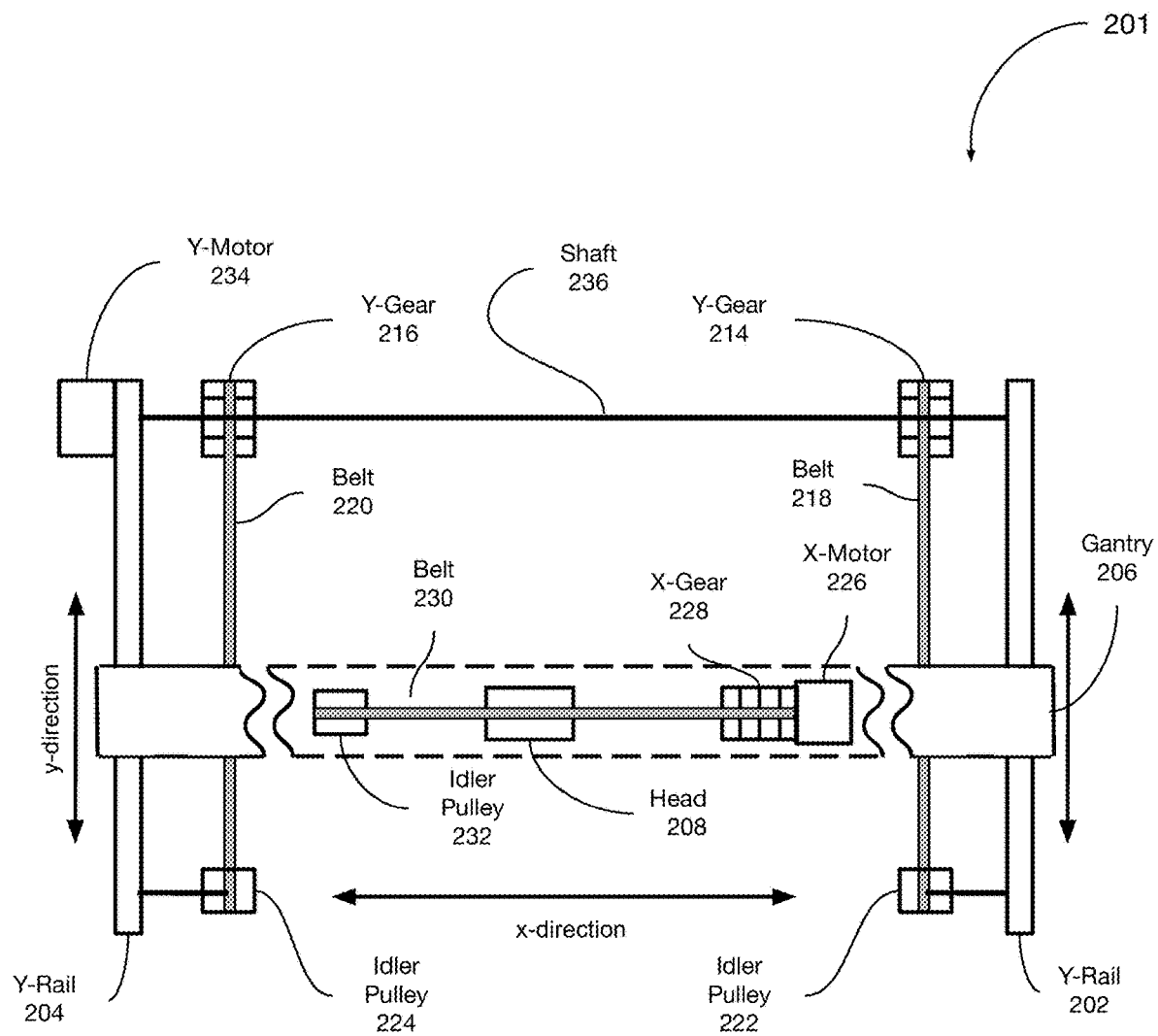
FIG. 2B shows a top view of a gantry assembly.

FIG. 2B shows a top view of another gantry assembly 201. In operation, gantry assembly 201 may be installed within a CNC machine. For example, gantry assembly 201 may be installed within the interior space 104 of the housing 102 of the CNC machine 100.

Gantry assembly 201 (FIG. 2B) is the same as gantry assembly 200 (FIG. 2A) in all respects except that (i) gantry assembly 201 has only a single y-motor (i.e., y-motor 234) rather than two y-motors (i.e., y-motors 210 and 212) as in gantry assembly 200, and (ii) gantry assembly 201 includes shaft 236 connecting y-gear 216 with y-gear 214 whereas gantry assembly 200 does not contain shaft 236.

In operation, the single y-motor 234 is connected to a set of y-gear/belt/idler pulley subassemblies via shaft 236. Each y-gear/belt/idler pulley subassembly is attached to one of the y-rails 202 and 204 and arranged to control the motion of the gantry 206 in the y-direction. In particular, y-motor 234 (e.g., a stepper motor) is coupled via shaft 236 to (i) y-gear 216, which drives belt 220, which runs between y-gear 216 and idler pulley 224, and (ii) y-gear 214, which drives belt 218, which runs between y-gear 214 and idler pulley 222. The y-gear/belt/idler pulley subassembly formed from y-gear 214, belt 218, and idler pulley 222 is attached to y-rail 202. The y-gear/belt/idler pulley subassembly formed from y-gear 216, belt 220, and idler pulley 224 is attached to y-rail 204.

Another typical design goal of some laser systems is a low-cost gantry drive system. Because one of the more expensive individual components of a gantry drive system is the electric motors, the gantry assembly 201 attempts to satisfy the design goal of a low cost gantry drive system by controlling the gantry 206 with only two motors (i.e., x-motor 226 and y-motor 234) as compared to the gantry assembly 200 (FIG. 2A) which uses three motors (i.e., x-motor 226, y-motor 210, and y-motor 212).

However, using a single y-motor 234 as in gantry assembly 201 can negatively impact performance of the CNC machine 100. For example, movement of the gantry 206 along y-rail 202 (the side of the gantry assembly 201 without a y-motor) tends to trail movement of the gantry 206 along y-rail 204 (the side of the gantry assembly 201 where y-motor 234 is positioned) primarily because of the weight of the gantry 206 and the distance between the y-rails 202 and 204. Further, the speed of the gantry 206 in the y-direction produces torque that exacerbates the problem because the shaft 236 has mass that tends to produce a trailing effect on the positioning of the gantry 206, and thus the laser head 208 comprising the laser (not shown). This torque can both (i) limit the speed at which the gantry assembly 201 can move the gantry 206 (and thus the laser head 208 comprising the laser) at least along the y-direction, and/or (ii) reduce the alignment precision of the gantry 206 (and thus the laser head 208 comprising the laser). In some scenarios, the potential for misalignment error increases at laser head positions located further away from y-motor 234.

In addition to reduced speed and lower precision as compared to gantry assembly 200 (FIG. 2A), the addition of shaft 236 in gantry assembly 201 (FIG. 2B) to enable the y-motor 234 to additionally drive the y-gear 214 also introduces an obstruction (i.e., the shaft 236 itself) that can prevent the placement of larger material into the interior space 104 of the housing 102 of a CNC machine 100 (FIG. 1). For example, the shaft 236 may obstruct the insertion of materials through pass-through slots 120 and 121 (FIG. 1). Or in embodiments where the front plate 118 is removable, the shaft 236 may obstruct or otherwise restrict the ability to place larger material into the interior space 104 (FIG. 1).

IV. Example Gantry Assembly Embodiments

Figure 3A:
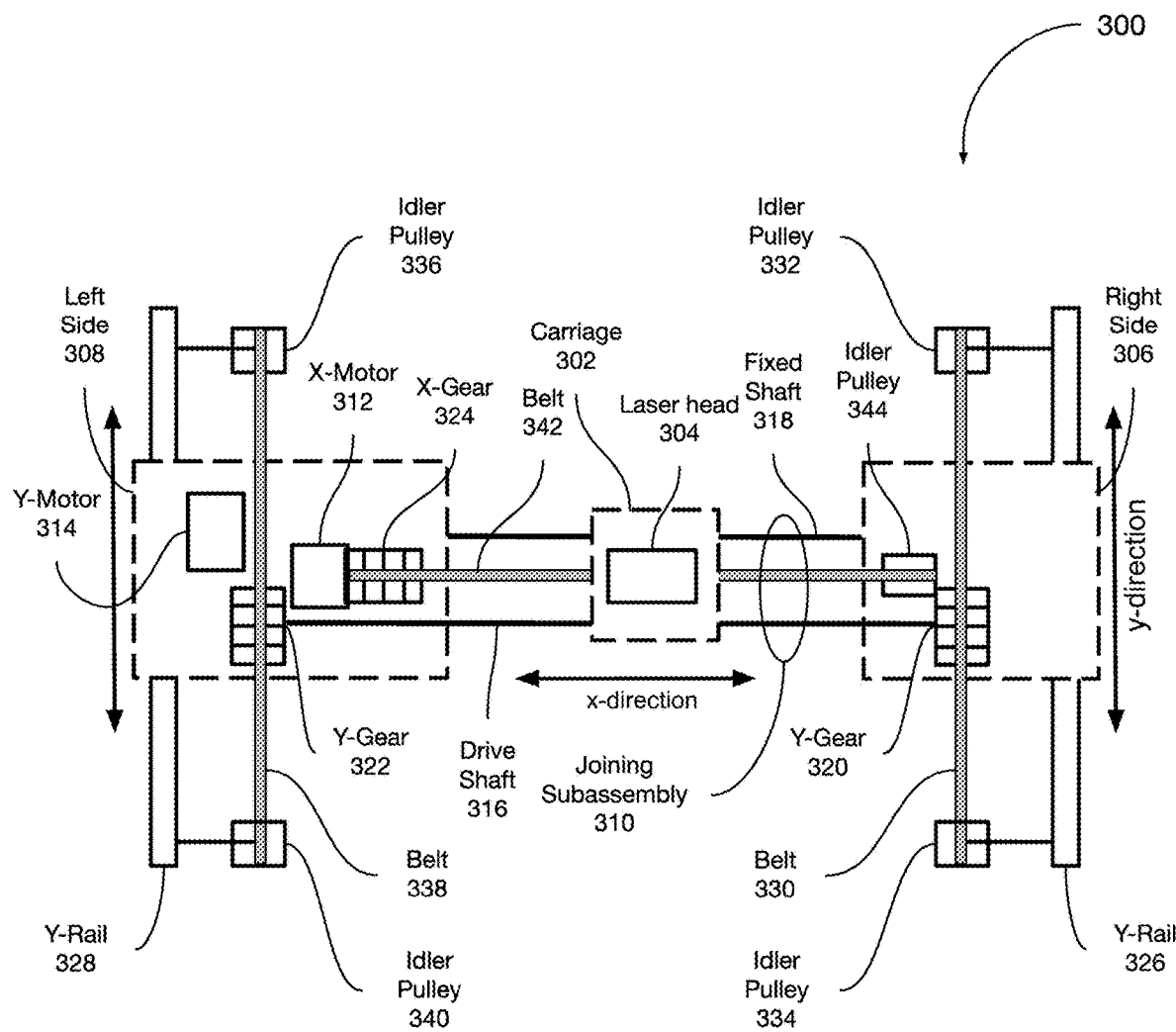
FIG. 3A shows a top view of a gantry assembly according to some embodiments.

FIG. 3A shows a top view of a gantry assembly 300 according to some embodiments of the inventions disclosed and described herein. In operation, gantry assembly 300 may be installed within a CNC machine such as CNC machine 100 (FIG. 1). For example, and as described in more detail below, gantry assembly 300 may be installed within the interior space 104 of the housing 102 of the CNC machine 100.

Gantry assembly 300 includes a carriage 302 that houses a laser head 304, a right side subassembly 306, and a left side subassembly 308. The right side subassembly 306 is moveable in the y-direction along y-rail 326 and the left side subassembly 308 is movable in the y-direction along y-rail 328. The right side subassembly 306 is joined to the left side subassembly 308 via the joining subassembly 310 such that the right side subassembly 306, the left side subassembly 308, and the joining subassembly 310 move together as a single gantry structure in manner similar to gantry 206 (FIGS. 2A and 2B).

When the gantry assembly 300 is installed within the CNC machine 100 of FIG. 1, the y-rail 326 (on the right side of the gantry assembly 300) is proximate to and extends substantially along at least a portion of the right interior wall 108 of the housing 102, and the y-rail 328 (on the left side of the gantry assembly 300) is proximate to and extends substantially along at least a portion of the left interior wall 110 of the housing 102 opposite the right interior wall 108.

In some embodiments, the y-rail 326 extends substantially along the right interior wall 108 of the housing 102 along the length (or substantially along the length) from interior wall 112 at the front of the housing 102 to interior wall 114 at the back of the housing 102. And the y-rail 328 extends substantially along the left interior wall 110 of the housing 102 along the length (or substantially along the length) from interior wall 112 at the front of the housing 102 to interior wall 114 at the back of the housing 102. In some embodiments, the interior walls of the housing 102 include notches or other indentations along the walls that are designed to receive the y-rails 326 and 328 (or at least mounting portions thereof), thereby enabling the y-rails 326 and 328 to be snapped and/or plugged securely into place via the notches or other indentations.

In operation, the right side subassembly 306 is configured to move in the y-direction within the interior space 104 of the housing 102 via y-rail 326, and the left side subassembly 308 is configured to move in the y-direction within the interior space 104 of the housing 102 via y-rail 328. The y-rail 328 (on the left side) is substantially parallel to y-rail 326 (on the right side). As mentioned earlier, the right side subassembly 306 is joined to the left side subassembly 308 via the joining subassembly 310 such that the right side subassembly 306, the left side subassembly 308, and the joining subassembly 310 move together as a single gantry structure.

In some embodiments, y-rail 326 and y-rail 328 are made from a hard, low friction material. In operation, y-rail 326 and y-rail 328 can be used to align the gantry assembly 300 and restrict degrees of freedom of movement of the gantry assembly 300 to help maintain positional accuracy of gantry assembly 300 components, including but not limited to the carriage 302 and the laser head 304 affixed thereon.

In some embodiments, the right side subassembly 306 includes one or more friction pads (or similar friction causing components now known or later developed) at the interface between the bottom of the right side subassembly 306 and the top of the y-rail 326. Additionally or alternatively, the left side subassembly 308 includes one or more friction pads (or similar friction causing components now known or later developed) at the interface between the bottom of the left side subassembly 308 and the top of the y-rail 328. These friction pads (or similar components) maintain a constant (or substantially constant) preload force to prevent misalignment of the gantry structure (formed from the right side subassembly 306, left side subassembly 308, and the joining subassembly 310) while in motion, particularly when the gantry structure starts to move in the y-direction along y-rails 326 and 328 and when the gantry structure slows to a stop in the y-direction along y-rails 326 and 328. In this manner, the one or more friction pads (or similar components) form at least one of (i) a first interface between the right side subassembly 306 and y-rail 326 that provides a first preload force between the right side subassembly 306 and y-rail 326, and (ii) a second interface between the left side subassembly 308 and y-rail 328 that provides a second preload force between the left side subassembly 308 and the y-rail 328.

Additionally, some embodiments include anti-lift and/or stabilization mechanisms located under one or both of the y-rail 326 and/or y-rail 328 that prevent the gantry structure from lifting (e.g., via user interference or other force) away from the y-rail 326 and/or y-rail 328. These anti-lift and/or stabilization mechanisms may take the form of one or more clips, locks, latches, hooks, or other mechanisms sufficient to prevent the gantry structure of the gantry assembly 300 from moving in the z-direction, perpendicular to the x-direction and the y-direction. Lifting or otherwise moving one or both of the right side subassembly 306 or the left side subassembly 308 away from the y-rail 326 or y-rail 328 can cause the gantry assembly 300 components to become misaligned and/or cause the gantry assembly 300 control algorithms to become uncalibrated, either of which can cause poor laser fabrication results.

In some embodiments, a first anti-lift and/or stabilization mechanism is located on the right side subassembly 306 (and moves with the right side subassembly 306) and a second anti-lift and/or stabilization mechanism is located on the left side subassembly 308 (and moves with the left side subassembly 308). In operation, these one or more anti-lift and/or stabilization mechanisms are configured to constrain movement of the right side subassembly 306 and the left side subassembly 308 in the z-direction, substantially perpendicular to both the x-direction and the y-direction.

As mentioned earlier, the right side subassembly 306 and the left side subassembly 308 are joined via a joining assembly 310 that extends between the right side subassembly 306 and the left side subassembly 308. The fixed shaft 318 rigidly connects the right side subassembly 306 to the left side subassembly 308. In some embodiments, the fixed shaft 318 is substantially parallel to the drive shaft 316.

Figure 3B:
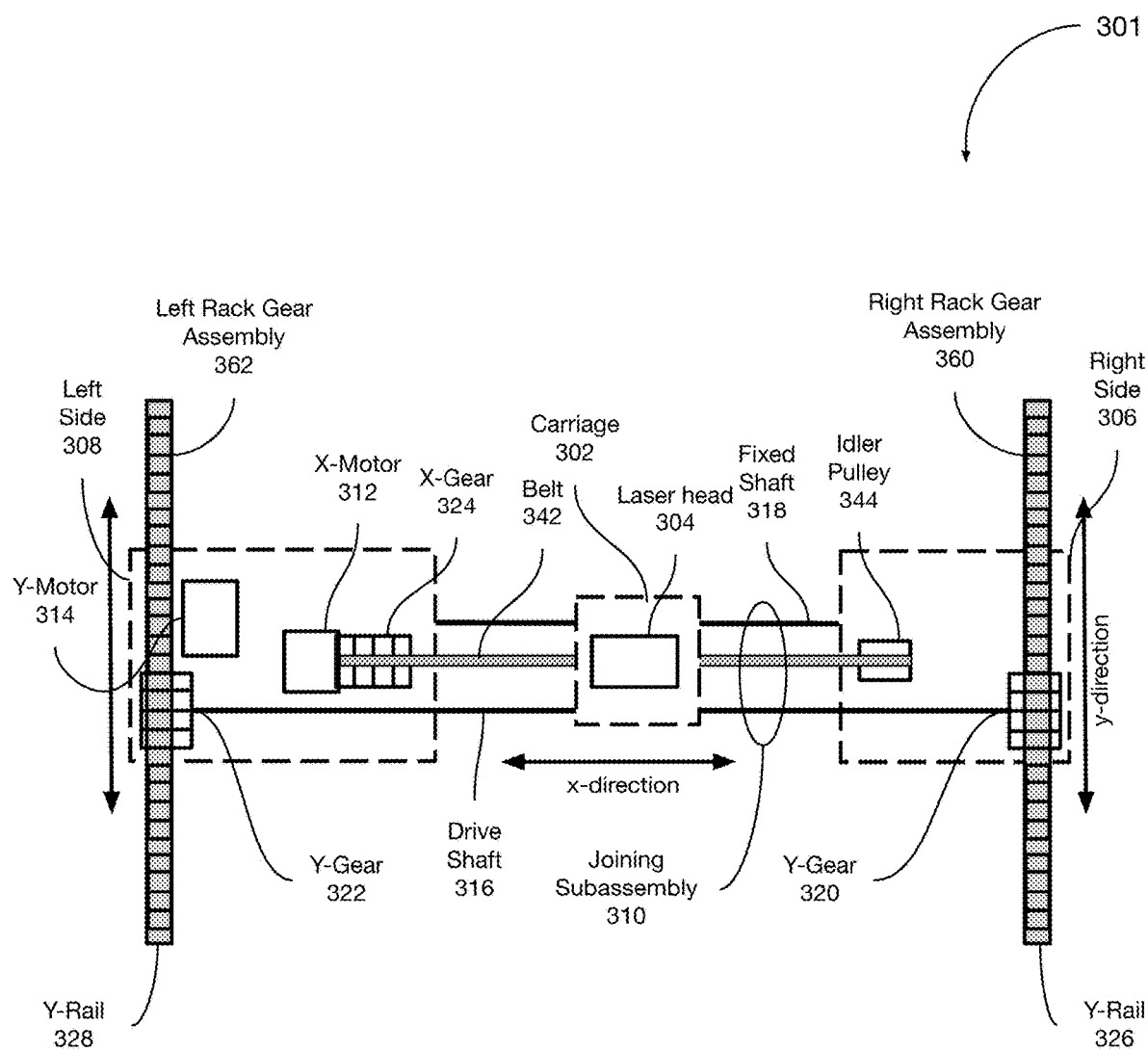
FIG. 3B shows a top view of aspects of a gantry assembly according to some embodiments.

In the example embodiments shown in FIGS. 3A and 3B, the joining assembly 310 includes a fixed shaft 318 and a drive shaft 316. However, in other embodiments, the joining assembly 310 may include joining mechanisms different than cylindrically-shaped shafts. For example, rather than a cylindrically-shaped shaft with a circular cross-section, one or both of the fixed shaft 318 and/or the drive shaft 316 may have an oval-shaped cross-section, a square-shaped cross-section, a rectangular-shaped cross section, etc.

Ultimately, the fixed shaft 318 may take substantially any form or shape that is sufficient to maintain a rigid physical connection between the right side subassembly 306 and the left side subassembly 308 that causes the right side subassembly 306, the left side subassembly 308, and the joining subassembly 310 to move together as a single component or structure (sometimes referred to herein as the gantry structure of gantry assembly 300). Additional details regarding the configuration and arrangement of the fixed shaft 318, drive shaft 316, carriage 302, and laser head 304 in various embodiments are shown and described herein with reference to FIGS. 4A-4D.

In some alternative embodiments, the joining subassembly 310 that joins the left side subassembly 308 with the right side subassembly 306 may additionally or alternatively include (i) a fixed member that connects the right and left side subassemblies in a manner similar to the fixed shaft 318, and (ii) a hollow member arranged to at least partially enclose a drive shaft or similar drive mechanism. In such alternative embodiments, the carriage 302 is configured to slide along the fixed member and the hollow member back and forth along the joining subassembly 310 in the x-direction in a manner similar to how the carriage 302 is described as sliding along the fixed shaft 318 and the drive shaft 316.

In FIG. 3A, the left side subassembly 308 includes (i) an x-motor 312 that is configured to control the position of the carriage 302 (and the laser head 304 affixed thereto) in the x-direction along the joining subassembly 310 between the right side subassembly 306 and the left side subassembly 308, and (ii) a y-motor 314 that is configured to control the position of the right side subassembly 306 and the left side subassembly 308 together along y-direction. As shown in FIG. 3A, the x-direction is substantially perpendicular to the y-direction. In some embodiments, the x-motor 312 and y-motor 314 are positioned at substantially 90 degrees relative to each other on the left side subassembly 308. In some embodiments, the x-gear 324 and y-gear 322 (described further below) are additionally or alternatively positioned at substantially 90 degrees relative to each other on the left side subassembly 308.

The drive shaft 316 is connected to and operated by the y-motor 314. The drive shaft 316 extends along at least a portion of the joining subassembly 310 and is arranged to facilitate movement of the right side subassembly 306 together with the left side subassembly 308 in the y-direction.

To facilitate the movement of the right side subassembly 306 together with the left side subassembly 308 in the y-direction, the right side subassembly 306 includes y-gear 320 connected to the drive shaft 316, and the left side subassembly 308 includes a corresponding y-gear 322. The y-gear 320 on the right side subassembly 306 and the y-gear 322 on the left side subassembly 308 are connected to each other via the drive shaft 316, which is coupled to the y-motor 314 via a linkage (not shown). In operation, the y-motor 314 is configured to (i) control movement of the y-gear 322 (on the left side subassembly 308) via the linkage (not shown) and (ii) control movement of the y-gear 320 (on the right side subassembly 306) by axially rotating the y-gear 322, which in turn axially rotates the drive shaft 316 and the y-gear 320 (on the right side subassembly 306) connected thereto.

Also to facilitate the movement of the right side subassembly 306 together with the left side subassembly 308 in the y-direction, the gantry assembly 300 additionally includes two belt-and-pulley arrangements that are driven by y-motor 314, y-gear 322, drive shaft 316, and y-gear 320. In the first belt-and-pulley arrangement (on the right side), y-gear 320 is connected to and drives belt 330, which runs between idler pulley 332 and idler pulley 334. This first belt-and-pulley arrangement is configured to facilitate movement of the right side subassembly 306 in the y-direction via y-rail 326. In the second belt-and-pulley arrangement (on the left side), y-gear 322 is connected to and drives belt 338, which runs between idler pulley 336 and idler pulley 340. This second belt-and-pulley arrangement is configured to facilitate movement of the left side subassembly 308 in the y-direction via y-rail 328.

In alternative embodiments, rather than the first and second belt-and-pulley arrangements, y-motor 314 and y-gears 320 and 322 may instead facilitate movement of the right side subassembly 306 and left side subassembly 308 via an alternative mechanism, such as a screw drive, chain drive, rack gearing or other type of drive and/or gearing mechanism now known or later developed that is sufficient to facilitate movement of the right side subassembly 306 and left side subassembly 308 along the y-rails 326 and 328.

The left side subassembly 308 also includes x-gear 324, which is coupled to the x-motor 312 via a second linkage (not shown). The x-motor 312 is configured to control the position of the carriage 302 in the x-direction along the joining subassembly 310 via the second linkage (not shown) and the x-gear 324. The x-motor 312 and x-gear 324 work in conjunction with a third belt-and-pulley arrangement including belt 342 and idler pulley 344. In this third belt-and-pulley arrangement, the x-gear drives belt 342, which runs between x-gear 324 and idler pulley 344. This third belt-and-pulley arrangement is configured to facilitate movement of the carriage 302 in the x-direction along the joining subassembly 310 extending between the right side subassembly 306 and left side subassembly 308.

In alternative embodiments, rather than the third belt-and-pulley arrangement, x-motor 312 and x-gear 324 may instead control the position of the carriage 302 in the x-direction along the joining subassembly 310 via an alternative mechanism, such as a screw drive, chain drive, or other type of drive mechanism now known or later developed that is sufficient to move the carriage 302 back and forth along the joining subassembly 310 in the x-direction between the right side subassembly 306 and the left side subassembly 308.

FIG. 3B shows a top view of aspects of a gantry assembly 301 according to some alternative embodiments. Like the gantry assembly 300 shown in FIG. 3A, the gantry assembly 301 shown in FIG. 3B may be installed within a CNC machine such as CNC machine 100 (FIG. 1) in substantially the same manner as gantry assembly 300 shown in FIG. 3A.

Gantry assembly 301 is substantially the same as gantry assembly 300 in all respects and includes many of the same components as gantry assembly 300 except that gantry assembly 301 in FIG. 3B uses a right rack gear assembly 360 integrated with the right y-rail 326 and a left rack gear assembly 362 integrated with the left y-rail 328 to facilitate the movement of the right side subassembly 306 together with the left side subassembly 308 in the y-direction rather than the two belt-and-pulley arrangements used in gantry assembly 300 shown in FIG. 3A. In operation, the right gear rack assembly 360 and left gear rack assembly 362, in conjunction with the drive shaft 316, helps to maintain the squareness of the gantry assembly 301, while also requiring fewer components (and thus, having a corresponding lower cost) than the gantry assembly 300 shown in FIG. 3A.

In some embodiments, the x-motor 312 is a stepper motor and the y-motor 314 is a stepper motor. In other embodiments, the x-motor 312 and/or the y-motor 314 may be any other type of electric motor now known or later developed that is suitable for controlling the x-y positioning of the carriage 302 for CNC applications.

In some scenarios, dynamic problems can arise where rotation of the drive shaft 316 causes one side or corner of the right side subassembly 306 to lift up, which can affect positioning accuracy of the gantry assembly 300/301. Therefore, in some embodiments, the right side subassembly 306 is weighted to counteract the lifting force imposed upon the right side subassembly 306 caused by rotation of the drive shaft 316. For example, if the weight of the right side subassembly 306 and all the components located thereon (or therein) is not sufficient to counteract the lifting force caused by rotation of the drive shaft 316, then some embodiments may include one or more weights placed strategically on (or perhaps within) the right side subassembly 306 to counteract the lifting force and, in turn, improve positioning accuracy.

In operation, the carriage 302 (and the laser head 304 affixed thereto) moves in the x-direction along the length of the joining assembly 310, and the joining assembly 310 moves in the y-direction together with the right side subassembly 306 and the left side subassembly 308, thereby moving the carriage 302 (and the laser head 304 affixed thereto) in the y-direction. This combination of x-direction movement and y-direction movement enables the carriage 302 (and the laser head 304) to be positioned at different x-y coordinates within the interior space 104 of the housing 102 of the CNC machine 100 (FIG. 1). In some embodiments, the laser head 304 includes components, e.g., motors and lenses (not shown), that are configured to focus the laser contained therein at different positions along the z-direction within the interior space 104 of the housing 102 of the CNC machine 100.

Figure 4A:
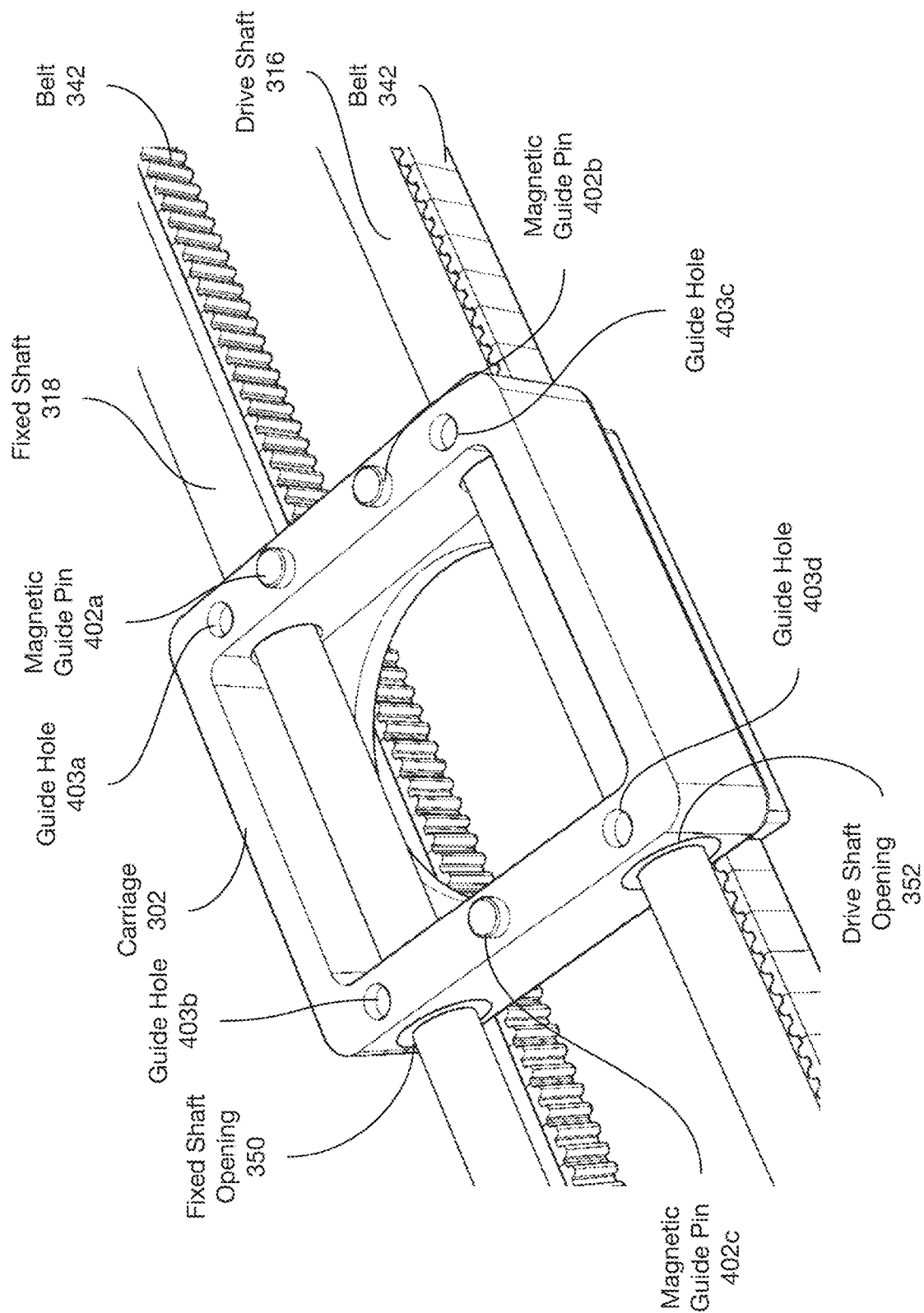
FIG. 4A shows aspects of a carriage used with gantry assemblies according to some embodiments.
Figure 4B:
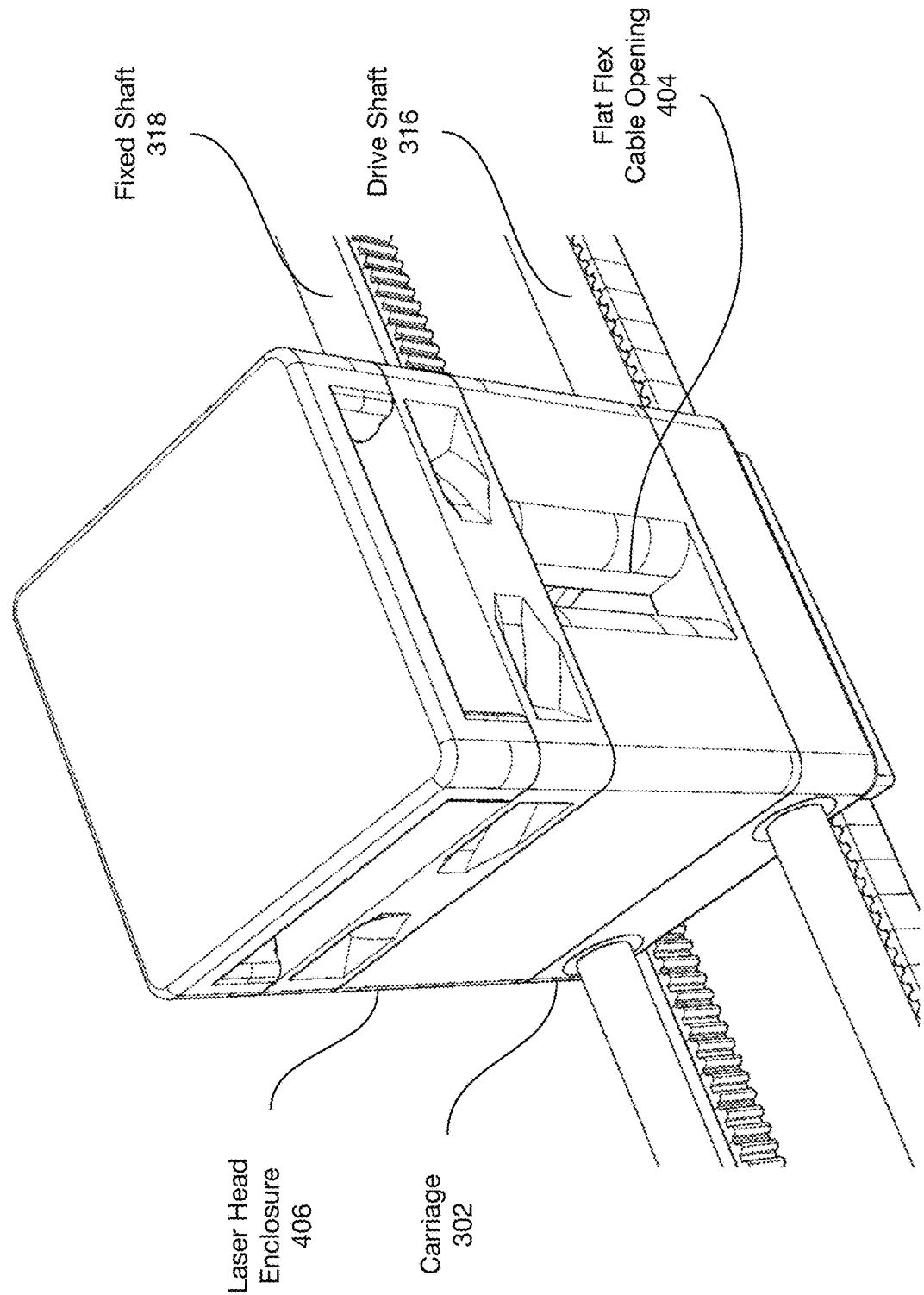
FIG. 4B shows a laser head enclosure affixed to a carriage and configured to house the laser head according to some embodiments.

FIG. 4A shows aspects of the carriage 302 used with gantry assemblies 300/301 according to some embodiments. The carriage 302 is configured to support a laser head contained within a laser head enclosure 406. FIG. 4B shows the laser head enclosure 406 affixed to the carriage 302 and configured to house the laser head (e.g., laser head 304 shown in FIGS. 3A and 3B).

As explained above with reference to FIGS. 3A and 3B, the x-motor 312 and x-gear 324 work in conjunction with a belt-and-pulley arrangement including belt 342 and idler pulley 344. In this belt-and-pulley arrangement, the x-gear drives belt 342, which runs between x-gear 324 and idler pulley 344. This belt-and-pulley arrangement is configured to facilitate movement of the carriage 302 in the x-direction along the fixed shaft 318 and drive shaft 316 of the joining subassembly 310 extending between the right side subassembly 306 and left side subassembly 308.

In the embodiment shown in FIG. 4A, belt 342 runs parallel to the fixed shaft 318 and the drive shaft 316. The belt 342 is routed with respect to the fixed shaft 318 and drive shaft 316 so that an opening exists between the fixed shaft 318 and drive shaft 316. Once the laser head enclosure 406 is attached to the carriage 302 as shown in FIG. 4B, an opening in the bottom of the carriage 302 aligns with the opening between the fixed shaft 318 and drive shaft 316. This alignment allows the laser contained within the laser head enclosure 406 to fire downward through the opening in the bottom of the carriage 302 and between the fixed shaft 318 and drive shaft 316 toward material positioned within the interior space 104 of the housing 102 (FIG. 1) of the CNC machine 100 (FIG. 1) below the gantry assembly 300/301.

In some embodiments, the laser head enclosure 406 includes a flat flex cable opening 404 arranged to receive a flat flex cable configured to provide components contained within the laser head enclosure 406 (e.g., the laser head and/or other components) with power and control signaling (and perhaps other data, too) from corresponding power and control circuitry, respectively. In some embodiments, at least some of the power and control circuitry for powering, communicating with, and controlling the components contained within the laser head enclosure 406 are housed in the control compartment 116 of the CNC machine 100 (FIG. 1). Although a flat flex cable (sometimes called a ribbon cable) is shown in the example embodiment depicted in FIG. 4B, any type of cabling now known or later developed could be used to provide power, communication, and control signaling to components within the laser head enclosure 406.

Alternatively, in some embodiments, rather than using a physical cable to provide power, control signaling, and/or other data to/from the components contained within the laser head enclosure 406, power, control signaling, and/or other data could instead be provided to (or received from) the components within the laser head enclosure 406 via one or both of the drive shaft 316 and/or the fixed shaft 318.

For example, in some embodiments, power and/or control signaling components housed in control compartment 116 are connected to power and/or control interfaces located on the left side subassembly 308. These power and/or control interfaces on the left side subassembly 308 are connected to the drive shaft 316 and/or the fixed shaft 318 to provide power, control signaling, and/or other data to the laser head enclosure 406 (and the components contained therein).

In some embodiments, power is provided to the laser head enclosure 406 (and the components contained therein) via the drive shaft 316 and/or the fixed shaft 318, where (i) one of the drive shaft 316 or fixed shaft 318 is configured as an anode, and (ii) the other of the drive shaft 316 or fixed shaft 318 is configured as a cathode. For example, 5 volt DC power (or 12 volt DC power or any other suitable DC or AC voltage) is applied to one of the two shafts, and the other of the two shafts functions as a ground or return.

In some embodiments, an interface on the left side subassembly 308 to a power source (e.g., a power source located in control compartment 116) is connected to a first graphite brush (not shown) on the left side subassembly 308 via a first power jumper cable. The first graphite brush on the left side subassembly 308 is electrically coupled to the fixed shaft 318. A second graphite brush (not shown) on the carriage 302 (or alternatively on the laser head enclosure 406) is also electrically coupled to the fixed shaft 318. This second graphite brush on the carriage 302 (or laser head enclosure 406) is connected to a laser head control board via a second power jumper cable. Thus, in operation, the power is routed from the power interface on the left side subassembly 308 to the laser head control board in the laser head enclosure 406 via a connection comprising the first power jumper cable, the first graphite brush, the fixed shaft 318, the second graphite brush, and the second power jumper cable.

In such embodiments where the power is provided to the laser head enclosure 406 via the fixed shaft 318 in manner described above, the ground or return is provided to the laser head enclosure 406 via the drive shaft 316. A ground interface on the left side subassembly 308 to ground (e.g., a ground located in control compartment 116) is connected to a third graphite brush (not shown) on the left side subassembly 308 via a first ground jumper cable. The third graphite brush on the left side subassembly 308 is electrically coupled to the drive shaft 316. A fourth graphite brush (not shown) on the carriage 302 (or alternatively on the laser head enclosure 406) is also electrically coupled to the drive shaft 316. This fourth graphite brush on the carriage 302 (or laser head enclosure 406) is connected to the laser head control board via a second ground jumper cable. Thus, in operation, the ground or return is routed from the laser head control board in the laser head enclosure 406 to the ground interface on the left side subassembly 308 via a connection comprising the first ground jumper cable, the third graphite brush, the drive shaft 316, the fourth graphite brush, and the second ground jumper cable. Alternatively, the drive shaft 316 could be used for power and the fixed shaft 318 could be used for the ground or return.

In some embodiments, control signaling to control the operation of components within the laser head enclosure 406 is also provided via the drive shaft 316 and fixed shaft 318. For example, control signaling to/from components within the control compartment 116 can be transmitted to and/or received from components within the laser head enclosure 406 via carrier modulated signals transmitted along the fixed shaft 318 and/or drive shaft 316. Additionally or alternatively, the components for controlling the operation of the gantry assembly 300/301 (e.g., one or more processors and other control components) could be located on the left side subassembly 308. In some embodiments, control signaling can be transmitted to and/or received from components within the laser head enclosure 406 via carrier modulated signals transmitted along the same combination of jumpers and graphite brushes used for providing power and ground connections to the laser head enclosure 406 via the fixed shaft 318 and/or drive shaft 316.

Some embodiments that provide power, control signaling, and/or other data to components within the laser head enclosure 406 may additionally include (i) one or more high pass filters for use with coupling the control signal to the fixed shaft 318 and/or drive shaft 316, and/or (ii) one or more low pass filters for use with coupling the power signal to the fixed shaft 318 and/or drive shaft 316.

Although the embodiments described above employ graphite brushes for coupling power and signaling to the fixed shaft 318 and drive shaft 316, other suitable couplings could be used in addition to or instead of graphite brushes, including any type of electrical coupling now known or later developed that is suitable for transferring power and control signaling to/from the fixed and drive shafts.

In still further embodiments, control signaling to control the operation of components within the laser head enclosure 406 could alternatively be provided via wireless transmission. For example, control signaling to/from components within the control compartment 116 can be wirelessly transmitted to and/or received from components within the laser head enclosure 406 via any wireless transmission protocol suitable for transmitting and receiving control signals for controlling the operation of components within the laser head enclosure 406.

In still further embodiments, the laser head enclosure 406 may include one or more processors and tangible, non-transitory computer readable media with program instructions that, when executed by the one or more processors, configure the one or more processors to control the components of the gantry assembly 300/301. Such embodiments may employ any of the arrangements of brushes, jumpers, and filters (in any suitable combination) described above for providing power, control signaling, and/or other data to/from the laser head enclosure 406. In such embodiments, the one or more processors within the laser head enclosure 406 are configured to transmit control signals (e.g., wirelessly, via a flex/ribbon cable, and/or via structural components of the gantry assembly such as the drive shaft 316 and fixed shaft 318) to the x-motor 312 and y-motor 314 on the left side subassembly 308. In such embodiments, housing the one or more processors for operating and controlling the gantry assembly 300/301 and the components within the laser head enclosure 406 within the laser head enclosure 406 facilitates easy replacement and upgrade of the laser and other control components contained within the laser head enclosure 406.

In embodiments consistent with FIGS. 4A and 4B, the laser head enclosure 406 is detachable from the carriage 302 to facilitate maintenance, configuration, repair, replacement, and/or upgrading the laser head enclosure 406 and/or the laser head contained therein. However, in other embodiments, the laser head enclosure 406 may not be detachable from the carriage 302.

To facilitate correct alignment of the laser head enclosure 406 with the carriage 302 for attachment, detachment, re-attachment, etc. of the laser head enclosure 406 to the carriage 302, the carriage 302 includes (i) a set of guide pins 402a, 402b, and 402c, and (ii) a set of guide holes 403a, 403b, 403c, and 403d. In some embodiments, one or more of the guide pins 402a, 402b, and 402c comprise magnetic guide pins, and/or one or more of the guide holes 403a, 403b, 403c, and 403d comprise magnetic guide holes. In operation, embodiments with magnetic guide pins and/or magnetic guide holes help to guide the laser head enclosure 406 into place during attachment and hold the laser head enclosure 406 securely in place during operation.

In the example embodiment shown in FIG. 4A, the guide holes 403a, 403b, 403c, and 403d in the carriage 302 are arranged to receive corresponding laser head enclosure guide pins (not shown) extending from the laser head enclosure 406. Likewise, laser head guide holes (not shown) are arranged to receive the guide pins 402a, 402b, and 402c extending from the carriage 302. This guide pin and guide hole arrangement ensures that the laser head enclosure 406 is reliably attached, affixed, mated, or otherwise joined to the carriage 302, and also ensures that the laser head enclosure 406 is held securely in place during operation of the laser.

Figure 4C:
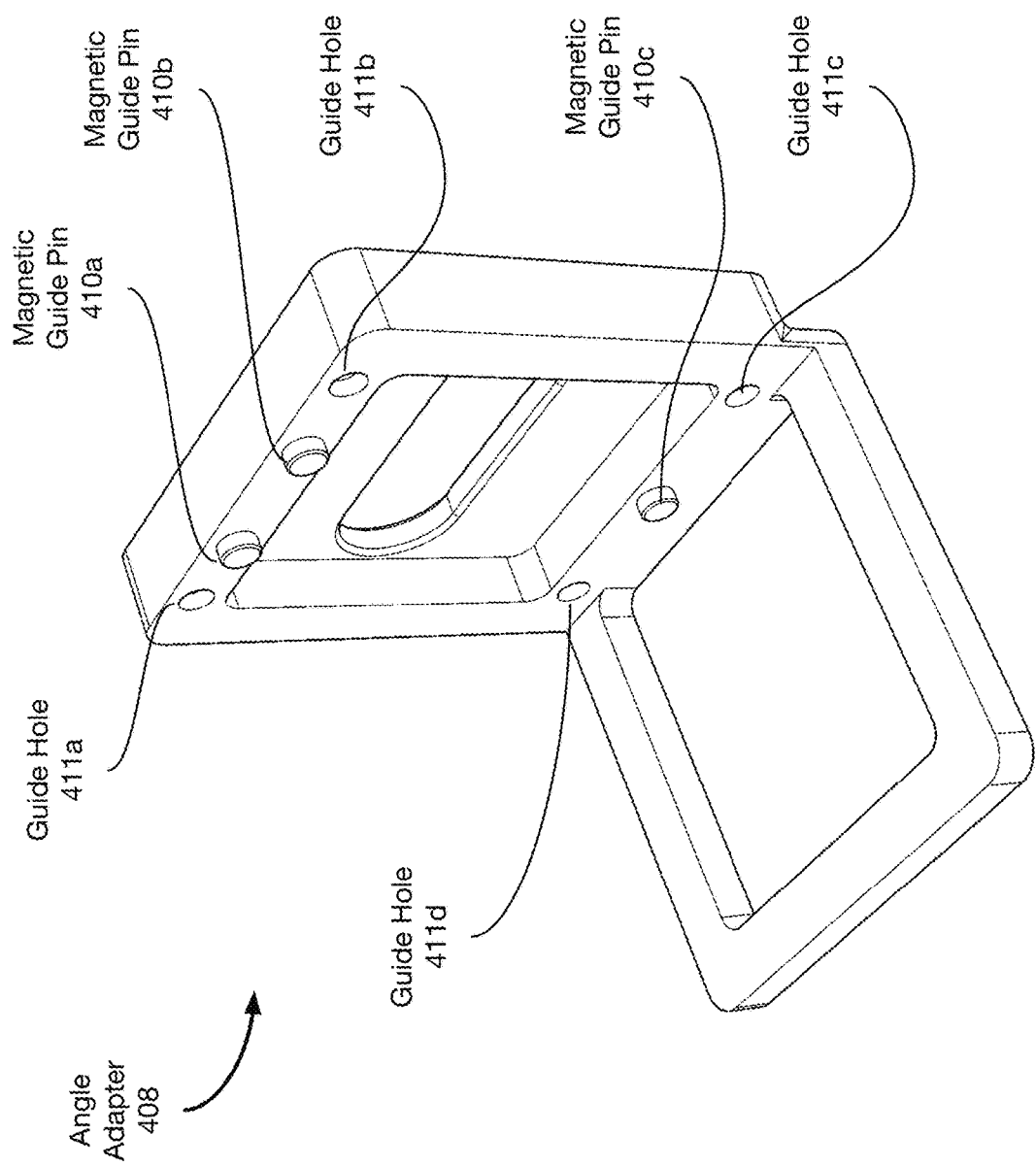
FIG. 4C shows an angle adapter for use with the carriage according to some embodiments.
Figure 4D:
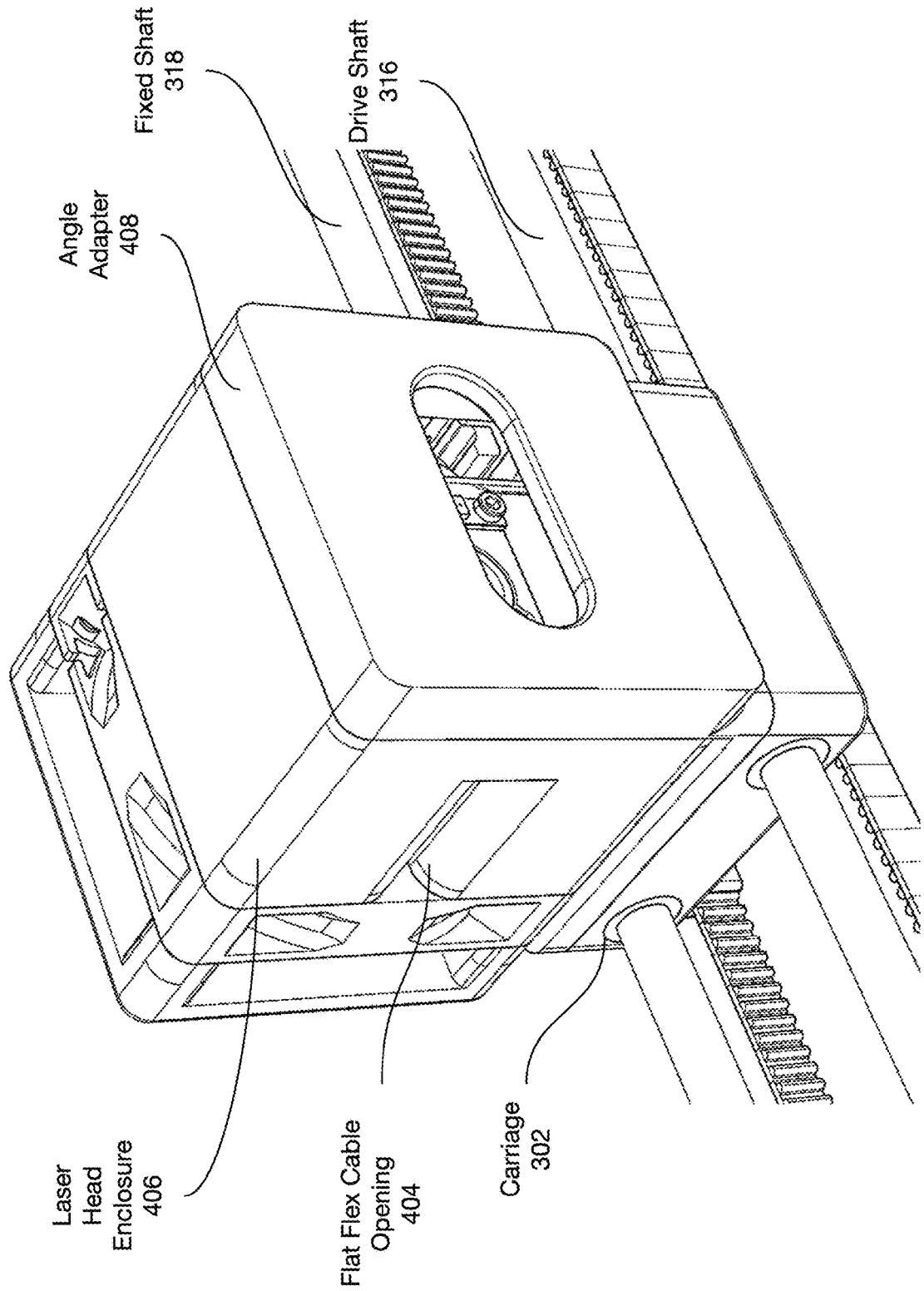
FIG. 4D shows a laser head enclosure attached to an angle adapter according to some embodiments.

In some embodiments consistent with the examples shown in FIGS. 4A, 4B, and 4D, the carriage 302 includes two openings: (i) a fixed shaft opening 350 and (ii) a drive shaft opening 352. The fixed shaft 318 extends through the fixed shaft opening 350 of the carriage 302, and the drive shaft 316 extends through the drive shaft opening 352 of the carriage 302. The drive shaft opening 352 of the carriage 302 is configured to allow the drive shaft 316 to axially rotate within drive shaft opening 352. In some embodiments, the circumference of the drive shaft opening 352 is sufficiently larger than the circumference of the drive shaft 316. For example, in some embodiments, the circumference of the drive shaft opening 352 is between 50-150 microns larger than the circumference of the drive shaft 316.

In operation, the fixed shaft 318 and the drive shaft 316 are arranged to guide movement of the carriage 302 in the x-direction by allowing the carriage 302 to slide back-and-forth along the fixed shaft 318 and the drive shaft 316. In this manner, the fixed shaft 318 and drive shaft 316 function like guide rails for the carriage 302 to facilitate accurate positioning of the carriage 302 (and the laser head enclosure 304 affixed thereto). In some embodiments, the carriage 302 includes linear bearings within the fixed shaft opening 350 and/or drive shaft opening 352 to facilitate smooth sliding of the carriage 302 along the fixed shaft 318 and the drive shaft 316.

FIGS. 4A, 4B, and 4D show the drive shaft 316 and the fixed shaft 318 as substantially the same circumference. But in other embodiments, the drive shaft 316 and the fixed shaft 318 may be different sizes. In some embodiments, the fixed shaft 318 may be larger than the drive shaft 316, e.g., 25%-150% larger than the drive shaft 316. Alternatively, the drive shaft 316 may be larger than the fixed shaft 318.

Alternatively, some embodiments may implement a drive mechanism different than a drive shaft, such as a drive chain, drive belt, or any other alternative drive mechanism now known or later developed that is suitable for transferring mechanical energy from one or more gears on the left side subassembly 308 (FIGS. 3A, 3B) to one or more gears on the right side subassembly 306 (FIGS. 3A, 3B). In some embodiments, at least a portion of the alternative drive mechanism may be contained within a housing over which the carriage 302 is configured to slide. In some embodiments, at least a portion of the drive shaft 316 may be contained within a housing over which the carriage 302 is configured to slide.

FIG. 4C shows an angle adapter 408 for use with the carriage 302. The angle adapter 408 is configured to attach to the top of the carriage 302. As shown in FIG. 4D, when the laser head enclosure 406 is attached to the angle adapter 408, the laser head within the laser head enclosure 406 is positioned to fire in an outward direction rather than a downward direction between the drive shaft 316 and the fixed shaft 318 as shown in FIGS. 4A and 4B.

To facilitate attachment of the laser head enclosure 406 to the angle adapter 408, the angle adapter 408 includes (i) guide pins 410a, 410b, and 410c, and (ii) guide holes 411a, 411b, 411c, and 411d. In some embodiments, one or more of the guide pins 410a, 410b, and 410c comprise magnetic guide pins, and/or one or more of the guide holes 411a, 411b, 411c, and 411d comprise magnetic guide holes.

In operation, the guide pins 410a, 410b, and 410c, and the guide holes 411a, 411b, 411c, and 411d of the angle adapter 408 perform substantially the same function as the guide pins 402a, 402b, and 402c, and the guide holes 403a, 403b, 403c, and 403d of the carriage 302. In particular, the guide holes 411a, 411b, 411c, and 411d in the angle adapter 408 are arranged to receive corresponding laser head enclosure guide pins (not shown) extending from the laser head enclosure 406. Likewise, laser head guide holes (not shown) are arranged to receive the guide pins 410a, 410b, and 410c extending from the angle adapter 408. This guide pin and guide hole arrangement ensures that the laser head enclosure 406 is reliably attached, affixed, mated, or otherwise joined to the angle adapter 408.

In some embodiments, when the laser head enclosure 406 is attached to the carriage 302 via the angle adapter 408 as shown in FIGS. 4C and 4D, the laser within the laser head enclosure 406 is positioned to fire in a direction that is substantially perpendicular to the direction that the laser fires when the laser head enclosure 406 is attached to the carriage 302 directly as shown in the FIGS. 4A and 4B. In some embodiments, instead of 90° relative to the downward laser firing direction shown in FIGS. 4A and 4B, the angle adapter 408 shown in FIGS. 4C and 4D may position the laser to fire at a different angle that is greater or less than 90° relative to the downward laser firing direction shown in FIGS. 4A and 4B. In some embodiments, the carriage 302 may be arranged to accommodate several different angle adaptors that each are configured to fire the laser at different angles relative to the downward laser firing direction shown in FIGS. 4A and 4B. In some embodiments, the angle adapter 408 is adjustable to accommodate different firing angles.

In operation, the angle adapter 408 enables the CNC machine to accommodate material that might be taller than the space between the floor (sometimes referred to as the material bed) of the interior area 104 (FIG. 1) and the joining subassembly 310 (FIGS. 3A and 3B) of the gantry assembly 300/301. In some embodiments, the material to be processed by the CNC machine sits on a rotary adapter (not shown) which can turn (i.e., spin) the material so that a sideways-firing laser (e.g., as shown in FIGS. 4C and 4D) can apply laser energy to the material in both x- and y-dimensions.

In some embodiments of this sideways-firing configuration, the gantry assembly 300/301 (FIGS. 3A and 3B) additionally includes a soft stop feature configured to stop movement of the gantry assembly components in the y dimension so that components of the gantry assembly (e.g., the carriage 302, joining subassembly 310, the right side subassembly 306, and/or the left side subassembly 308) do not run into the material being processed by the CNC machine. In some embodiments, this soft stop feature is implemented via one or more cameras and/or sensors on the gantry assembly and/or disposed within the interior space 104 of the housing 102. In operation, the one or more cameras and/or other sensors are configured to detect or otherwise sense the position of the material being machined by the CNC machine. Image and/or sensor data from these one or more cameras and/or sensors is provided to one or more processors, which in turn use the image and/or sensor data to control the movement and positioning of the gantry assembly.

In some alternative embodiments, the joining assembly 310 may comprise a single housing that (i) rigidly connects the left side subassembly 308 with the right side subassembly 306 in a manner similar to the fixed shaft 318, and (ii) houses a drive mechanism, such drive shaft 316 or an alternative drive mechanism as described above. In other alternative embodiments, instead of (or in addition to) the fixed shaft 318, the joining assembly 310 may include a rigid beam, a rigid plate, or other rigid structure to connect the right side subassembly 306 with the left side subassembly 308. In still further alternative embodiments, the joining subassembly 310 may include multiple fixed shafts (or similar rigid structures) rather than a single fixed shaft.

The right side subassembly 306 and the left side subassembly 308 are shown and described with reference to FIGS. 3A and 3B as separate subassemblies connected by the joining assembly 310. But in some embodiments, the right side subassembly 306, left side subassembly 308, and joining assembly 310 (or at least the fixed shaft 318 component thereof) may be integrated into a single component made from metal, plastic, or other suitably rigid material. However, in some embodiments, it may be advantageous for the right side subassembly 306, left side subassembly 308, and joining assembly 310 (or at least the fixed shaft 318 component thereof) to be manufactured as separate components and then connected together to form a structure sufficiently rigid to support positioning of the carriage 302 within the x-y plane as described above.

As shown in FIGS. 3A and 3B and described herein, the x-motor 312 and y-motor 314 that operate gantry assembly 300/301 are both located on the left side subassembly 308. In some embodiments, the x-motor 312 and the y-motor 314 may be alternatively mounted on the right side subassembly 306. Either way, because the x-motor 312 and y-motor 314 are located together on the same subassembly (either the right or left), the position of the x-motor 312 relative to the position of the y-motor 314 remains constant during (i) movement of the carriage 302 along the length of the joining assembly 310 in the x-direction between the right side subassembly 306 and the left side subassembly 308 and (ii) movement of the right side subassembly 306 and the left side subassembly 308 together in the y-direction.

Locating the x-motor 312 and the y-motor 314 on the left side subassembly 308 (or alternatively on the right side subassembly 306) provides technical and operational advantages over typical gantry assemblies. For example, locating both the x-motor 312 and the y-motor 314 on the same subassembly enables delivery of power and control signaling to the gantry assembly 300/301 via a single wiring harness. Such a configuration reduces the amount of wiring required to power and control the motors that operate the gantry assembly 300/301 and enables the gantry assembly 300/301 to be powered and controlled from only one side of the gantry assembly 300/301. Additionally, locating the x-motor 312 on the left side subassembly 308 (or alternatively on the right side subassembly 306) with the y-motor 314 enables the gantry assembly 300/301 to employ a lightweight carriage 302 as compared to alternative implementations that may locate an x-motor on the carriage 302 to control movement of the carriage 302 (and the laser head enclosure 406)

The configuration of having both the x-motor 312 and the y-motor 314 located together on the same side subassembly also eliminates the need for a shaft 236 (FIG. 2B) to connect rail-mounted y-direction drive components that would otherwise obstruct material pass-through areas (e.g., pass-through slots 120 and 121 or similar pass through areas) or other regions within the operating area of the CNC machine, and limit the size of the materials that the CNC machine can process. Thus, CNC machines that employ gantry assembly 300 (or gantry assembly 301) can accommodate larger materials to process as compared to typical gantry assemblies that incorporate a shaft 236 (FIG. 2B) or similar drive shaft and/or stabilization shaft arrangements.

Further, the configuration of having all the motors on a single side subassembly of the gantry assembly 300/301 also simplifies the initial assembling and later repairing of the CNC machine as compared to existing configurations. For example, the housing 102 can be manufactured separately from the gantry assembly 300/301, where all of the active mechanical components are on the gantry assembly 300/301. This enables the gantry assembly 300/301 to be mated to the housing 102 in the final manufacturing steps without requiring any electromechanical interfaces between the gantry assembly 300/301 and the housing 102. For example, mating the gantry assembly 300/301 with the housing 102 could include simply bolting (or otherwise attaching) the y-rails 326 and 328 to the housing 102 and connecting a single wiring harness to the left side subassembly 308 to power and control the x-motor 312 and y-motor 314 located on the left side subassembly 308.

Additionally, the gantry assembly 300/301 can later be removed in one piece for repair or servicing, and then re-installed in the housing 102 without having to disconnect/reconnect electromechanical interfaces. For example, removing the gantry assembly 300/301 from the housing 102 for repair or servicing could include unplugging a single wiring harness and unbolting (or otherwise detaching) the y-rails 326 and 328 from the housing 102. And replacing the gantry assembly 300/301 in the housing 102 after servicing and/or repair could include re-bolting (or otherwise re-attaching) the y-rails 326 and 328 to the enclosure and reconnecting the wiring harness.

In some embodiments, the gantry structure (i.e., the combination of the right side subassembly 306, the left side subassembly 308, and the joining subassembly 310 that move together as a single component or structure) of the gantry assembly 300/301 is removable from the y-rails 326 and 328 to facilitate servicing or repair. In such embodiments, the gantry structure can be removed from the y-rails 326 and 328 in one piece for servicing or repair, and then re-attached onto the y-rails 326 and 328 without having to disconnect/reconnect the y-rails 326 and 328 to/from the enclosure. For example, removing the gantry structure (i.e., the combination of the right side subassembly 306, the left side subassembly 308, and the joining subassembly 310 that move together as a single component or structure) from the y-rails 326 and 328 for repair or servicing could include unplugging a single wiring harness and detaching the gantry structure from the y-rails 326 and 328 while the y-rails 326 and 328 remain attached the housing 102. And replacing the gantry structure after servicing and/or repair could include re-attaching the gantry structure to the y-rails 326 and 328 and re-connecting the wiring harness.

In some embodiments, rather than using a ribbon cable or other type of wiring harness to provide power and control signaling to the laser head, structural elements of the gantry (such as, for example, the drive shaft 316 and fixed shaft 318) may be used to provide power and/or transmit control signals.

Further, the design of the gantry assembly 300/301 facilitates easy upgrading or changing of the gantry assembly in the future. For example, removing the gantry assembly 300/301 from the housing 102 for upgrade or swap-out could include unplugging a single wiring harness and unbolting (or otherwise un-attaching) the y-rails 326 and 328 from the housing 102. And installing an upgrades or swap-out gantry assembly in the housing 102 could include bolting (or otherwise attaching) the y-rails of the upgraded or swapped out gantry assembly to the enclosure and connecting the wiring harness thereto. For example, when a newer gantry assembly with newer lasers, newer laser lenses, more precise range of travel, better gearing, or other improvements is available, the older gantry assembly can be removed and replaced with the upgraded gantry assembly.

Similarly, when a different gantry assembly with different tools (e.g., a different laser, a mechanical cutter, or other different machining tool) is desired for a particular project, the existing gantry assembly can be swapped out with the different gantry assembly. And when the projecting requiring the different gantry assembly is complete, the original gantry assembly can be swapped back in to replace the different gantry assembly.

V. Conclusions

The description above discloses, among other things, various example systems, configurations, apparatus, and articles of manufacture. The examples disclosed and described herein are merely illustrative and should not be considered as limiting. Additionally, references herein to "embodiment" generally means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, including Read Only Memory (ROM), Random Access Memory (ROM), or other type of memory now known or later developed that is sufficient for storing software and/or firmware containing program instructions for execution by one or more processors.

What is claimed is:

1. A system comprising a gantry assembly, wherein the gantry assembly comprises:
   a carriage configured to accommodate a laser head;
   a first movable subassembly; and
   a second movable subassembly coupled to the first movable subassembly via a joining subassembly extending between the first movable subassembly and the second movable subassembly, wherein the second movable subassembly comprises (i) a first motor configured to control a position of the carriage along the joining subassembly along a first axis between the first movable subassembly and the second movable subassembly and (ii) a second motor configured to control a position of the first movable subassembly and the second movable subassembly together along a second axis substantially perpendicular to the first axis, thereby controlling a position of the carriage along the second axis; and
   wherein the joining subassembly comprises a drive mechanism operated by the second motor, wherein the drive mechanism is arranged to facilitate movement of the first movable subassembly together with the second movable subassembly along the second axis, wherein the drive mechanism operated by the second motor comprises a drive shaft that extends along at least a portion of the joining subassembly and is arranged to facilitate movement of the first movable subassembly together with the second movable subassembly along the second axis, and wherein the first movable subassembly further comprises a first gear connected to the drive shaft, wherein the second movable subassembly further comprises a second gear connected to the drive shaft and coupled to the second motor via a linkage, and wherein the second motor is configured to (i) control movement of the second gear via the linkage and (ii) control movement of the first gear by axially rotating the second gear about the first axis, thereby axially rotating the drive shaft and the first gear connected thereto about the first axis.

2. The system of claim 1, wherein a position of the first motor relative to a position of the second motor remains constant during (i) movement of the carriage along the first axis between the first movable subassembly and the second movable subassembly and (ii) movement of the first movable subassembly and the second movable subassembly together along the second axis.

3. The system of claim 1, wherein the joining subassembly further comprises a fixed shaft connecting the first movable subassembly to the second movable subassembly.

4. The system of claim 1, further comprising:
a first anti-lift stabilization mechanism located on the first movable subassembly and configured to move with the first movable subassembly; and
a second anti-lift stabilization mechanism located on the second movable subassembly and configured to move with the second movable subassembly; and
wherein the first anti-lift stabilization mechanism and the second anti-lift stabilization mechanism are configured to constrain movement of the first movable subassembly and the second movable subassembly in a third axis during operation, and wherein the third axis is substantially perpendicular to both the first axis and the second axis.

5. The system of claim 1, wherein the joining subassembly comprises a fixed shaft connecting the first movable subassembly to the second movable subassembly, and wherein the fixed shaft is substantially parallel to the drive shaft.

6. The system of claim 5, wherein the fixed shaft extends through a first opening of the carriage, wherein the drive shaft extends through a second opening of the carriage, and wherein the fixed shaft and the drive shaft are arranged to guide movement of the carriage along the first axis.

7. The system of claim 6, wherein the second opening of the carriage is configured to allow the drive shaft to axially rotate about the first axis within the second opening.

8. The system of claim 1, wherein the first movable subassembly comprises sufficient weight arranged to counteract a lifting force imposed upon the first movable subassembly via a rotation of the drive shaft.

9. The system of claim 1, wherein the second movable subassembly further comprises a third gear coupled to the first motor via a second linkage, and wherein the first motor is configured to control the position of the carriage in the first axis along the joining subassembly via the second linkage and the third gear.

10. The system of claim 1, wherein the first motor comprises a first stepper motor, and wherein the second motor comprises a second stepper motor.

11. The system of claim 1, further comprising:
a housing comprising at least four interior walls defining an interior space;
a first rail, wherein the first rail is proximate to and extends substantially along a first interior wall of the housing, and wherein the first movable subassembly is configured to move along the second axis via the first rail; and
a second rail, wherein the second rail is proximate to and extends substantially along a second interior wall of the housing opposite the first interior wall of the housing, wherein the second movable subassembly is configured to move along the second axis via the second rail, wherein the second rail is substantially parallel to the first rail.

12. The system of claim 11, further comprising:
a first interface between the first movable subassembly and the first rail, wherein the first interface is configured to provide a first preload force between the first movable subassembly and the first rail; and
a second interface between the second movable subassembly and the second rail, wherein the second interface is configured to provide a second preload force between the second movable subassembly and the second rail.

13. The system of claim 11, wherein the gantry assembly further comprises:
a first belt-and-pulley arrangement configured to facilitate movement of the first movable subassembly along the second axis via the first rail; and
a second belt-and-pulley arrangement configured to facilitate movement of the second movable subassembly along the second axis via the second rail parallel to the first rail.

14. The system of claim 11, wherein the gantry assembly further comprises:
a first rack gear assembly configured to facilitate movement of the first movable subassembly along the second axis via the first rail; and
a second rack gear assembly configured to facilitate movement of the second movable subassembly along the second axis via the second rail parallel to the first rail.

15. The system of claim 11, wherein the housing further comprises a pass through area arranged to allow materials to be moved into and out of the interior space free from obstruction caused by the gantry assembly.

16. The system of claim 11, further comprising:
a wiring harness arranged to provide power and control signals to the first motor and the second motor from outside of the housing.

17. The system of claim 11, further comprising:
a wiring harness connected to the second movable subassembly and configured to provide power and control signals to both the first motor and the second motor; and
wherein the gantry assembly is configured to be removable as a single structure by (i) disconnecting the wiring harness, and (ii) detaching the first movable subassembly and second movable subassembly from the first rail and the second rail, respectively, while the first rail and the second rail remain attached to the housing; and
wherein the gantry assembly is configured to be re-installable as a single structure by (i) reattaching the first movable subassembly and second movable subassembly to the first rail and the second rail, respectively, and (ii) reconnecting the wiring harness.

18. The system of claim 1, further comprising one or more stabilization assemblies configured to constrain movement of the gantry assembly along a third axis that is substantially perpendicular to both the first axis and the second axis.

19. The system of claim 13, further comprising:
- a third belt-and-pulley arrangement configured to facilitate movement of the carriage along the first axis via the joining subassembly extending between the first movable subassembly and the second movable subassembly.

20. The system of claim 1, further comprising:
one or more processors;
a tangible, non-transitory computer-readable memory; and
program instructions stored on the tangible, non-transitory computer-readable memory, wherein the program instructions are executable by the one or more processors to cause the system to:
control a position of the laser head along the first axis by controlling the first motor; and
control a position of the laser head along the second axis by controlling the second motor.

* * * * *